United States Patent [19]

Aron

[11] 4,144,699
[45] Mar. 20, 1979

[54] HAYMAKING MACHINE FOR TEDDING AND WINDROWING OF FODDER

[75] Inventor: Jérôme Aron, Dossenheim sur Zinsel, France

[73] Assignee: Kuhn, S.A., Saverne, France

[21] Appl. No.: 762,725

[22] Filed: Jan. 26, 1977

[30] Foreign Application Priority Data

Jan. 30, 1976 [FR] France .................... 76 03525

[51] Int. Cl.² .......................................... A01D 79/00
[52] U.S. Cl. .................................................. 56/370
[58] Field of Search ................ 56/370, 365, 366, 367

[56] References Cited

U.S. PATENT DOCUMENTS

| | | | |
|---|---|---|---|
| 3,546,867 | 12/1970 | Hauser-Lienhard | 56/370 |
| 3,664,105 | 5/1972 | Stiefrater et al. | 56/370 |
| 3,735,573 | 5/1973 | Dziuba et al. | 56/370 |
| 3,910,019 | 10/1975 | Schlittler | 56/370 |

Primary Examiner—Russell R. Kinsey
Attorney, Agent, or Firm—Young & Thompson

[57] ABSTRACT

A haymaking machine for the tedding and windrowing of fodder, comprises a pair of rake wheels driven in rotation on which working tool carrier arms extend outwardly and are mounted for pivoting in support bearings articulatedly connected to a drive hub. Each of these arms has at its end adjacent the axis of rotation of the corresponding rake wheel, a control crank having a roller thereon. The roller rolls on one of two guide tracks. The inner guide track is for windrowing and the outer guide track is for tedding. The arms occupy a relatively raised position and the axes of rotation of the wheels are tipped forward during tedding; while the arms occupy a relatively lowered position and the axes of rotation of the wheels are substantially upright during windrowing.

17 Claims, 9 Drawing Figures

HAYMAKING MACHINE FOR TEDDING AND WINDROWING OF FODDER

The present invention relates to a haymaking machine for the tedding and windrowing of fodder, comprising one or more rake wheels driven in rotation, on which working tool-carrier arms extend outwards and are mounted for pivoting in support bearings articulated to a drive hub, each of the said working tool-carrier arms having a control crank provided with a roller, at its end facing the rotation axis of the corresponding rake wheel.

In known machines of this kind, as shown for example in French Pat. No. 2,010,323 or U.S. Pat. No. 3,910,019, the rollers of the control cranks of the tool-carrier arms move during windrowing in a control cam having a single guide track, in order to pivot the working tools, over a partial range of their trajectory, upwards and in the direction opposite to the direction of rotation of the corresponding rake wheel. For tedding it is necessary to withdraw the rollers of the control cranks from the control cam by outward displacement of the said rollers. This movement of the rollers in order to bring them into engagement with the control cam for windrowing and out of engagement with the said control cam for tedding necessitates fine adjustments.

Moreover each of the tool-carrier arms must be brought separately into the tedding position and must be immobilised in the said position so that it can no longer rotate about its longitudinal axis, which represents a frequent loss of time for the user. In another known machine of this kind the rollers of the control cranks of the tool-carrier arms are applied during windrowing against a control cam having one single guide track, by means of torsion springs, in order to pivot the working tools, over a partial zone of their trajectory, upwards and in the direction opposite to the direction of rotation of the corresponding rake wheel.

In this machine the tool-carrier arms of one and the same rake wheel can be brought from the windrowing position into the tedding position by a downward disengagement of the control cam until the rollers of the control cranks of the tool-carrier arms are out of engagement with the said cam.

A great drawback of this form of embodiment consists in the fact that in the transposition of the machine from the windrowing position into the tedding position or vice versa, the control cam must be displaced axially. This is not desirable in view of the fact that the position of the said cam and its rigidity in relation to its support shaft affect the trajectory described by the working tools during windrowing and thus the quality of the windrowing work. Moreover during the movement from the windrowing position into the tedding position, the angle formed between the longitudinal axis of the portion of the tool-carrier arms which is disposed in the support bearings, when this axis extends in a plane parallel to the direction of travel of the machine, with a plane perpendicular to the direction of travel which passes through the rotation axis of the corresponding rake wheel, does not vary. Therefore it is necessary to displace the support wheel downwards so as to impart an appropriate inclination to the rake wheels for the tedding work. Furthermore since the said angle does not vary during the movement from the windrowing position into the tedding position, the working tools retain, both before and behind the rake wheel — seen in the direction of travel — one and the same position substantially perpendicular to a plane perpendicular to the axis of rotation of the rake wheel and passing through the extremities of the working tools, which prevents simultaneously good picking up of the fodder before the rake wheel and good clearance of the said fodder behind the said rake wheel. In this machine the movement from the windrowing position into the tedding position does not increase the diameter of the trajectories described by the working tools, which is detrimental to the quality of the tedding work on a machine having two or more rake wheels. Moreover the torsion springs which apply the rollers against the guide cam are continuously thrust during work, resulting in rapid fatigue of the said springs followed by a substantial drop in the quality of the work, in particular during tedding when the fodder to be displaced is still green and thus heavy.

In another machine of the kind with which the invention is concerned, as shown for example in French Pat. No. 1,352,702, the rollers fast with control cranks of the tool-carrier arms move on a control cam of variable profile. In this machine action is necessary upon the control cam for the movement from the windrowing position into the tedding position or vice versa, which is undesirable since the rigidity of this cam affects the quality of the work. Moreover in this machine there is no increase in the diameter of the trajectories described by the working tools and no variation in the angle formed by the longitudinal axis of the portion of the tool-carrier arms which is disposed in the support bearings, when this axis extends in a plane parallel to the direction of travel of the machine, with a plane perpendicular to the said direction of travel which passes through the rotation axis of the corresponding rake wheel, upon movement from the windrowing position into the tedding position.

In a final known machine the rollers of the control cranks of the tool-carrier arms move on a control cam which comprises two guide tracks. One of these permits of guiding the said rollers during windrowing and the other permits of bringing all the working tools out of contact with the ground in a raised transport position. Thus this machine has an operation and a result which are different from those of the present invention. Moreover in this known machine, in the passage of the rollers from the windrowing guide track to the transport guide track, the angle formed between the longitudinal axis of the portion of the tool-carrier arms which is disposed in the support bearings, when this axis extends in a plane parallel to the direction of travel of the machine, and a plane perpendicular to the direction of travel which passes through the rotation of the axis of the corresponding rake wheel does not vary.

The purpose of the present invention consists in obtaining a haymaking machine for tedding and windrowing of the kind described in the introduction which does not possess the above-mentioned drawbacks of the known machines.

To this end one of the characteristics of the invention consists in that the rollers of the control cranks of the tool-carrier arms move during work in a control cam having two guide tracks, one of the said guide tracks being intended to guide the rollers of the control cranks of one and the same rake wheel during windrowing and the other of the said guide tracks being intended to guide the said rollers during tedding, and in that the angle formed during windrowing by the longitudinal axis of the portion of the tool-carrier arms which is disposed in the support bearings, when this axis extends in a plane parallel with the direction of travel of the machine, with a plane perpendicular to the said direction of travel which passes through the axis of rotation of the corresponding rake wheel, is greater than the angle formed during tedding by the said longitudinal axis of the portion of the tool-carrier arms which is disposed in the support bearings when this axis extends in a plane parallel to the direction of travel, with the said plane perpendicular to the direction of travel which passes through the axis of rotation of the corresponding rake wheel.

According to a further characteristic of the invention the rollers of the control cranks of the tool-carrier arms of one and the same rake wheel are moved from the guide track intended for their guidance during windrowing to the guide track intended for their guidance during tedding by pivoting outwards of the tool-carrier arms and their support bearings about their articulations to the drive hub, under the action of centrifugal force, when the said rake wheel is driven in rotation and the said tool-carrier arms and their support bearings are unlocked from the windrowing position.

According to another characteristic of the invention the rollers of the control cranks of the tool-carrier arms of one and the same rake wheel are moved from the guide track intended for their guidance during tedding to the guide track intended for their guidance during windrowing by inward pivoting of the tool-carrier arms and their support bearings about their articulations to the drive hub, especially under the action of the inherent weight of the said tool-carrier arms, the support bearings and the working tools when the said rake wheel is substantially stationary and the said tool-carrier arms and their support bearings are unlocked from the tedding position.

The invention will be explained in greater detail hereinafter with further characteristics and advantages by reference to a form of embodiment of the invention illustrated by way of non-limitative example in the accompanying drawings, wherein:

FIG. 1 represents a plan view of a machine according to the invention in the windrowing position, FIG. 2 represents a plan view of a machine according to the invention in the tedding position, FIG. 5 shows diagrammatically the profile of a variant of embodiment of the guide track for tedding and the position of the working tools when their respective control rollers are situated in the different slopes of this guide track, FIG. 6 represents a partial section of a rake wheel in the windrowing position, along the section line 6—6 in FIG. 3, FIG. 7 represents a partial section of a rake wheel in the tedding position, along the section line 7—7 in FIG. 4, FIG. 8 represents a partial section of a rake wheel in the tedding position, with a second example of embodiment of the device for locking the positioning member of the tool-carrier arms, FIG. 9 represents a partial section along the section line 9—9 in FIG. 8.

In the drawings, the haymaking machine for tedding and windrowing according to the invention as represented in FIGS. 1 and 2 comprises by way of non-limitative example two rake wheels 1 and 2 interconnected by a transverse beam 3. This machine can be coupled to a tractor (not shown) for example by means of a three-point linkage. During operation the machine can be supported on the ground by means of small wheels 5 disposed beneath the rake wheels 1 and 2. These rake wheels 1 and 2 are driven in rotation about their respective rotation axes 6, 7 in known manner by drive elements (not shown) extending from the power take-off of the tractor to the said rake wheels, passing through gear boxes 8, 9 and 10, so that the rake wheels rotate either in opposite directions or in the same direction. Thus in the case of a machine having two rake wheels these can rotate so as to converge forward — in the direction of travel — both for tedding and for windrowing. Alternatively the rake wheels of the machine according to the invention can be made to rotate so as to converge forward for tedding — in the direction of travel — and in the same direction of rotation for windrowing, in order to deposit the windrow laterally. In this latter case the beam 3 can be placed obliquely in relation to the direction of travel of the machine so that one rake wheel is placed further forward than the other, in order that the fodder to be windrowed is transmitted from one rake wheel to the other.

Figure 3:
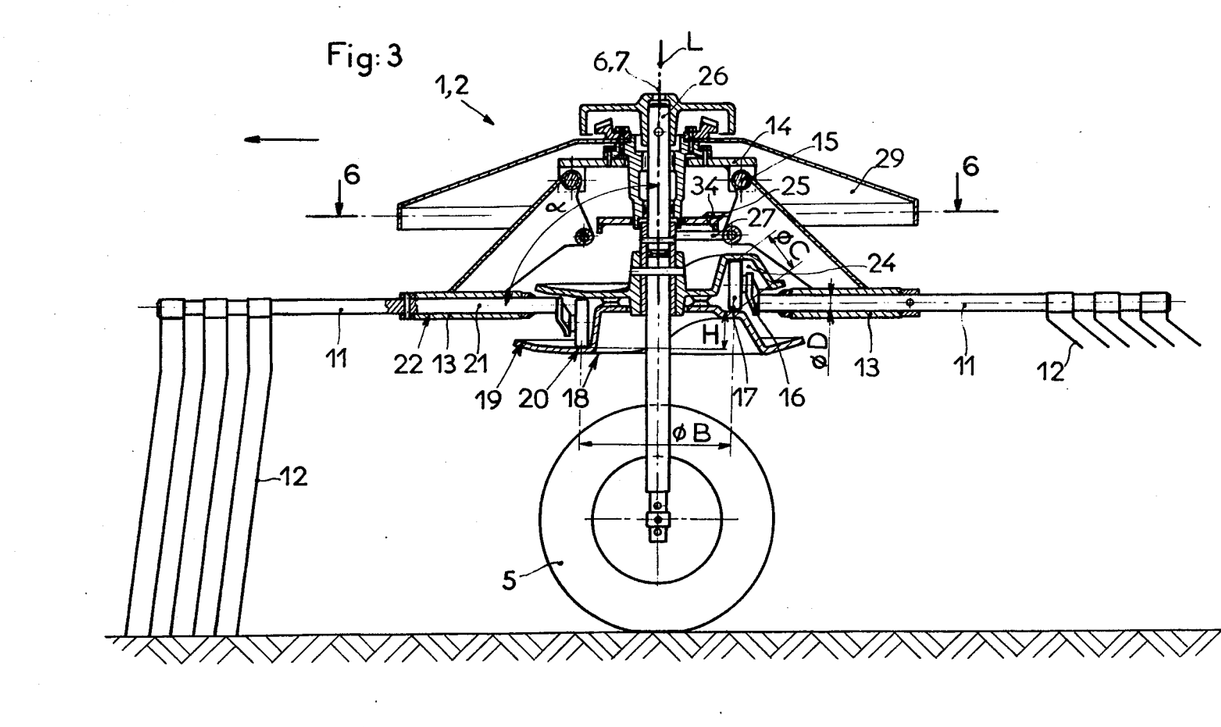
FIG. 3 represents a section, on a larger scale, of a rake wheel according to the invention in the windrowing position, along the section line 3—3 in FIG. 1.
Figure 4:
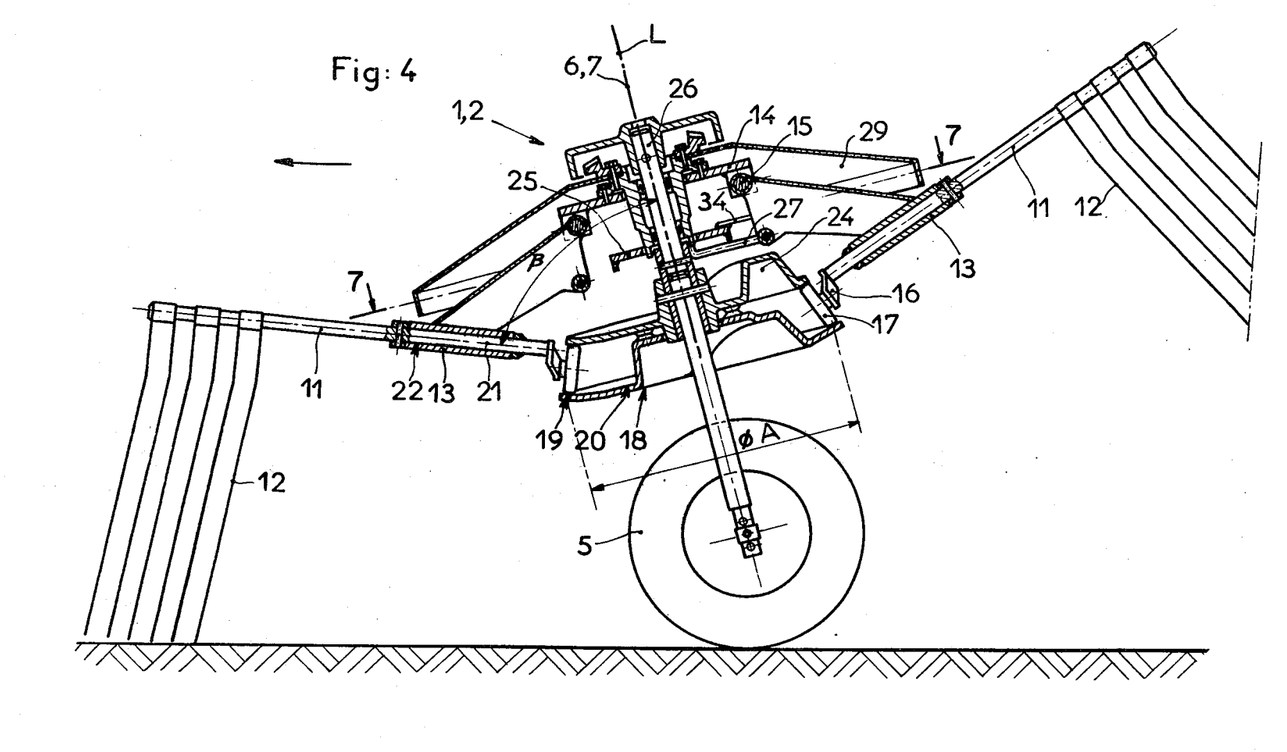
FIG. 4 represents a section on a larger scale of a rake wheel according to the invention in the tedding position, along the section line 4—4 in FIG. 2.

Arms 11 carrying working tools 12 such as forks, tines or analogous elements are mounted for pivoting on each rake wheel 1 and 2 in support bearings 13 (see FIGS. 3 and 4). Each support bearing 13 is articulatedly connected to a drive hud 14 through the pivot pins 15. Each arm 11 carrying working tools 12 comprises, at its end turned towards the rotation axis 6 or 7 of the corresponding rake wheel 1 or 2, a control crank 16 provided with a roller 17.

According to the invention the said rollers 17 move during operation, that is when the rake wheels 1 and 2 are driven in rotation, in a control cam 18 having two guide tracks 19, 20, one of the said guide tracks being intended to guide the rollers 17 of one and the same rake wheel during windrowing work and the other of the said guide tracks being intended to guide the said rollers 17 during tedding work. Thus the rake wheels 1 and 2 can be transposed from the windrowing position into the tedding position without it being necessary to withdraw the rollers 17 of the control cranks 16 from the control cam 18 or to act upon the said control cam 18 for the purpose of shifting it axially or modifying its profile.

According to one important characteristic the angle α formed during windrowing by the longitudinal axis 21 of the portion 22 of the tool-carrier arms 11 which is disposed in the support bearings 13, when this axis 21 extends in a plane P parallel to the direction of travel of the machine, with a plane L substantially perpendicular to the said direction of travel which passes through the rotation axis 6 or 7 of the corresponding rake wheel 1 or 2 (FIGS. 1 and 3) is greater than the angle β formed during tedding by the said longitudinal axis 21 of the portion 22 of the tool-carrier arms 11 which is disposed in the support bearings 13, when this axis 21 extends in a plane P parallel to the direction of travel, with the said plane L substantially perpendicular to the direction of travel which passes through the rotation axis 6 or 7 of the corresponding rake wheel 1 or 2 (FIGS. 2 and 4). This characteristic permits of inclining the rake wheels 1 and 2 forward in the direction of travel by an appropriate angle for tedding work, by means of a device such as a threaded crank 23 which pivots the transverse beam 3 in relation to the three-point linkage 4, in order to favour the spreading of the fodder and to obtain both good picking up of the fodder in front of the rake wheels 1 and 2 and good clearance of the said fodder behind these wheels, without it being necessary to displace the support wheels 5 downwards.

According to the invention the control cam 18 is formed so that the diameter A of the guide track 19 intended to guide the rollers 17 of the control cranks 16 of the tool-carrier arms 11 during tedding is greater than the diameter B of the guide track 20 which is intended to guide the said rollers 17 during windrowing Therefore the transposition of the rollers 17 of the control cranks 16 from the guide track 20 intended for their guidance during windrowing to the guide track 19 intended for their guidance during tedding causes an increase of the diameter of the trajectory T described by the working tools 12 during tedding. This increase of diameter of the trajectory T described by the working tools 12 ensures tedding of excellent quality since, in the case of a machine having two or more rake wheels, the spacing between the trajectories described by the working tools of two adjacent rake wheels is considerably reduced; the said trajectories can even overlap deeply between the rotation axes of two adjacent rake wheels. By virtue of the control cam 18 having two guide tracks 19 and 20, the working tools 12 of the machine according to the invention are advantageously controlled simultaneously during windrowing and during tedding. To this end the guide track 20 intended to guide the rollers 17 of the control cranks 16 of the tool-carrier arms 11 during windrowing comprises in a manner known per se a vertically offset part 24 that is adapted to cause the working tools 12 over a partial range of their trajectory to pivot, through the intermediary of the control cranks 16, upwards and in the direction opposite to the direction of rotation of the corresponding rake wheel, in order to deposit the raked fodder in a windrow. The guide track 19 intended to guide the rollers 17 of the control cranks 16 of the tool-carrier arms 11 during tedding is substantially flat over its entire length so as to keep the working tools 12 in a position substantially perpendicular to the ground during their whole trajectory in order to obtain vigorous tedding of the fodder. However according to a variant of embodiment represented diagrammatically in FIG. 5, the guide track 19 intended to guide the rollers 17 of the control cranks 16 during tedding can comprise a slight vertical offset 36 in order to increase the length of the working zone W-X over which the working tools 12 are close to the ground in the forward part of their trajectory (see FIG. 2). To this effect this vertical offset 36 is made so that the working tools 12 pivot slightly upwards and in the direction opposite to the direction of rotation of the corresponding rake wheel as they approach the point of their trajectory situated foremost — seen in the direction of travel of the machine — and so that when the said point is passed they return progressively into their initial position. Since during tedding the rake wheels 1 and 2 are inclined forward in the direction of travel, thus the object is achieved of causing the working tools 12 of one and the same rake wheel to work substantially parallel with the ground over an arc of a certain length in order that the whole of the fodder spread over the length of this arc is reached by the said working tools 12.

This guide track 19 can likewise comprise a vertical offset 37 which causes the working tools 12 to pivot slightly upwards in the direction of rotation of the corresponding rake wheel when they are situated in the working zone X-Y in which the trajectories described by the working tools 12 of the two adjacent rake wheels 1, 2 overlap (see FIG. 2). By this pivoting the working tools 12 adopt a more aggressive angle of incidence which permits them to act more vigorously upon the fodder and to ensure better spreading thereof. The said guide track 19 for tedding can moreover comprise a vertical offset 38 which causes the working tools 12 to pivot slightly upwards afresh and in the direction opposite to the direction of rotation of the corresponding rake wheel, in the working zone Y-Z which follows said zone of overlap of the trajectories described by the working tools 12 (see FIG. 2). By virtue of this pivoting the speed of rotation of the extremities of the working tools 12 is retarded so as to facilitate the clearance of the fodder from the said working tools 12.

In the zone situated between the points Z and W the working tools 12 return progressively into their initial position, that is to say substantially perpendicular to the ground.

In order to permit the passage of the rollers 17 of the control cranks 16 of the tool-carrier arms 11 from the guide track 20 intended to guide the said rollers 17 during windrowing to the guide track 19 intended for their guidance during tedding, the diameter C of the said rollers 17 is at least equal to or greater than the sum of the height H of the vertical offset of the guide track 20 intended to guide the rollers 17 during windrowing and the diameter D of the tool-carrier arm 11. According to one important characteristic of the invention, the rollers 17 of the control cranks 16 of the tool-carrier arms 11 of one and the same rake wheel 1 or 2 are transposed from the guide track 20 intended to guide the said rollers 17 during windrowing to the guide track 19 intended to guide the said rollers during tedding by pivoting outwardly of the tool carrier arms 11 and their support bearings 13 about their pivot pins 15 to the drive hub 14, under the action of centrifugal force when the said rake wheel is driven in rotation and the said tool-carrier arms 11 and their support bearings 13 are unlocked from the windrowing position. Thus all the working tools of one and the same rake wheel 1 or 2 are brought simultaneously into the tedding position without any need for effecting individual adjustments for each of the tool-carrier arms 11. Conversely the rollers 17 of the control cranks 16 of the tool-carrier arms 11 of one and the same rake wheel 1 or 2 are transposed from the guide track 19 intended for their guidance during tedding on to the guide track 20 intended for their guidance during windrowing by inward pivoting of the tool-carrier arms 11 and their support bearings 13 about their pivot pins 15 to the drive hub 14 especially under the effect of the inherent weight of the said tool-carrier arms 11, the support bearings 13 and the working tools 12 when the said rake wheel is substantially stationary and the said tool-carrier arms 11 and their support bearings 13 are unlocked from the tedding position. During work the rollers 17 of the control cranks 16 of the tool-carrier arms 11 are maintained on the guide track 19 intended for their guidance during tedding or on the guide track 20 intended for their guidance during windrowing by means of a positioning member 25 mounted freely in rotation on the support shaft 26 of the corresponding rake wheel 1 or 2 (FIGS. 6 and 7). This positioning member 25 is connected to the support bearings 13 of the tool-carrier arms 11 of one and the same rake wheel 1 or 2 by means of rods 27 and can immobilise the said tool-carrier arms 11 and their support bearings 13 in two different positions, one close to the support shaft 26 of the rake wheel 1 or 2 in which the said rollers 17 are situated on the guide track 20 intended for their guidance during windrowing (FIGS. 3 and 6), and the other more remote from the said support shaft 26, in which the said rollers 17 are situated on the guide track 19 intended for their guidance during tedding (FIGS. 4 and 7). Since all the support bearings 13 of the tool-carrier arms 11 of one and the same rake wheel 1 or 2 are connected to one and the same positioning member 25, all the said arms 11 can likewise be moved simultaneously from the windrowing position into the tedding position by exertion of a manual traction upon one or more of these arms 11, so as to pivot them about the pivot pins 15 on the drive hub 14. Therefore the said movement does not necessitate individual adjustments for each tool-carrier arm 11.

Each transposition of the rollers 17 of the control cranks 16 from one guide track to the other causes an angular rotation of the positioning member 25 about the support shaft 26 of the corresponding rake wheel 1 or 2. In order to hold the rollers 17 of the control cranks 16 on the guide track 19 intended for their guidance during tedding or on the guide track 20 intended for their guidance during windrowing, the positioning member 25 can be locked in rotation in relation to the drive hub 14.

In a first example of embodiment the said locking can be effected by means of a spring bolt 28 disposed on a protector 29 fast with the said drive hub 14. For this purpose the said spring bolt 28 comprises at least one flat 30 and can engage automatically in lodgements 31 and 32 of a positioning plate 33 made fast with the positioning member 25 by means of an arm 34. The said lodgements 31 and 32 have the same profile as the spring bolt 28 and are disposed symmetrically in relation to an axis 35 passing between the said lodgements 31 and 32.

Thus when the spring bolt 28 is engaged in the lodgement 31 of the positioning plate 33, the positioning member 25 holds all the rollers 17 of the control cranks 16 of one and the same rake wheel 1 or 2 on the guide track 20 intended for their guidance during windrowing (FIG. 6). When the positioning member 25 has been subjected to an angular displacement and the spring bolt 28 is engaged in the lodgement 32 of the positioning plate 33, all the rollers 17 of the control cranks 16 of one and the same rake wheel 1 or 2 are immobilised on the guide track 19 intended for their guidance during tedding (FIG. 7). In order to unlock the positioning member 25 from the windrowing position it is sufficient to withdraw the spring bolt 28 from the lodgement 31 of the positioning plate 33 and to rotate the said spring bolt 28 through 180°. By virtue of the flat 30 the spring bolt 28 can then lodge only in the lodgement 32 of the positioning plate 33 which corresponds to the tedding position.

Conversely to unlock the positioning member 25 from the tedding position it is sufficient to withdraw the spring bolt 28 from the lodgement 32 of the positioning plate 33 and to rotate the said spring bolt 28 through 180°. By virtue of the flat 30 the spring bolt 28 can then lodge only in the lodgement 31 of the positioning plate 33 which corresponds to the windrowing position.

According to a second example of embodiment represented in FIGS. 8 and 9, the locking of the positioning member 25 can be effected by means of a bolt 39 articulatedly connected to the drive hub 14. This articulation can advantageously be effected by means of the articulation spindle 15 of one of the support bearings 13. The said bolt 39 comprises a fork 40 which cooperates with two bosses 41 and 42 fast with the positioning member 25 for the purpose of the locking of the latter in rotation. Each of the said bosses 41 and 42 corresponds to one of the working positions of the machine. Thus when the fork 40 of the bolt 39 is in engagement with the boss 41, it locks the positioning member 25 in the position in which the latter holds the tool-carrier arms 11 in the tedding position. Conversely when the said fork 40 is in engagement with the boss 42, it locks the positioning member 25 in the position in which the latter holds the tool-carrier arms 11 in the windrowing position. This bolt 39 is returned into the locking position by means of a spring 43.

In order to transpose the tool-carrier arms 11 from the tedding position into the windrowing position, it is sufficient to withdraw the fork 40 from the boss 41 so as to free the positioning member 25. The bolt 39 is then held in the unlocked position by means of the extremity 44 of a flat spring 46 which surrounds the support shaft 26 of the corresponding rake wheel 1 or 2. In fact as soon as the said fork 40 is withdrawn the extremity 44 of the said flat spring 46 places itself against the boss 41 and thus prevents the fork 40 from returning immediately into engagement with the latter. When the tool-carrier arms 11 arrive in the windrowing position the fork 40 by means of its flank laterally disengages the end 45 of the spring 46 which bore against the boss 42. This fork 40 then comes into engagement with the said boss 42 under the action of the spring 43.

In order to transpose the tool-carrier arms 11 from the windrowing position into the tedding position, a similar procedure is adopted. In order to permit the disengagement of the extremities 44 and 45 of the flat spring 46 by means of the fork 40 from the bolt 39, these extremities 44 and 45 extend beyond the bosses 41 and 42 of the positioning member 25.

According to one important characteristic, the interval between the bosses 41 and 42 is less than the total width of the fork 40, in order to prevent the latter from engaging between the said bosses 41 and 42 on the occasions of changes of working position.

This example of embodiment frees the protector 29 from all operating stresses and therefore permits a lighter and better sealed construction thereof.

The invention is not limited to the form of embodiment as illustrated in the accompanying Figures, therefore it is obviously possible to provide a machine having for example four rake wheels. In this case the rake wheels can rotate convergingly forward by pairs, in the direction of travel, for tedding and rotate by pairs in one and the same direction for windrowing so as to deposit a lateral windrow on each side of the machine, or ascentral windrow of large volume.

I claim:

1. In a haymaking machine for the tedding and windrowing of fodder, of the type comprising one or more rake wheels driven in rotation, on which working tool-carrier arms extend outwards and are mounted for pivoting in support bearings articulatedly connected to a drive hub, each of the said working tool-carrier arms having at its inner end a control crank provided with a roller; the improvement in which the said roller (17) moves during work in a control cam (18) having two guide tracks (19 and 20), one of the said guide tracks being intended to guide the rollers (17) of the control cranks (16) of the tool-carrier arms (11) of one and the same rake wheel (1 or 2) during windrowing work and the other of the said guide tracks being intended to guide the said rollers (17) during tedding work, and in that the angle (α) formed during windrowing by the longitudinal axis (21) of the portion (22) of the tool-carrier arms (11) which is disposed in the support bearings (13), when this axis (21) extends in a plane (P) parallel to the direction of travel of the machine, with a plan (L) substantially perpendicular to the said direction of travel which passes through the rotation axis (6 or 7) of the corresponding rake wheel (1 or 2), is greater than the angle (β) formed during tedding by the said longitudinal axis (21) of the portion (22) of the tool-carrier arms (11) which is disposed in the support bearings (13) when this axis (21) extends in a plane (P) parallel to the direction of travel, with the said plane (L) substantially perpendicular to the direction of travel which passes through the rotation axis (6 or 7) of the corresponding rake wheel (1 or 2).

2. A machine according to claim 1, characterised in that the diameter (A) of the guide track (19) intended to guide the rollers (17) of the control cranks (16) of the tool-carrier arms (11) during tedding is greater than the diameter (B) of the guide track (20) intended to guide the said rollers (17) during windrowing.

3. A machine according to claim 1 characterised in that the guide track (20) intended to guide the rollers (17) of the control cranks (16) of the tool-carrier arms (11) during windrowing in a manner known per se comprises a vertical offset (24) so as to pivot the working tools (12) through the intermediary of the control cranks (16) upwards and in the direction opposite to the direction of rotation of the corresponding rake wheel over a partial range of their trajectory.

4. A machine according to claim 1, characterised in that the guide track (19) intended to guide the rollers (17) of the control cranks (16) of the tool-carrier arms (11) during tedding is substantially plane over its entire length so as to keep the working tools (12) in a position substantially perpendicular to the ground over their whole trajectory.

5. A machine according to claim 1, characterised in that the guide track (19) intended to guide the rollers (17) of the control cranks (16) of the tool-carrier arms (11) during tedding comprises a slight vertical offset (36) so as to increase the length of the working zone W-X over which the working tools (12) are close to the ground in the forward part of their trajectory, during tedding.

6. A machine according to claim 1, characterised in that the guide track (19) intended to guide the rollers (17) of the control cranks (16) of the tool-carrier arms (11) during tedding comprises a vertical offset (37) in order to impart a more aggressive angle of incidence to the working tools (12) in the working zone X-Y in which the trajectories described by the working tools (12) of two adjacent rake wheels (1, 2) overlap.

7. A machine according to claim 1, characterised in that the guide track (19) intended to guide the rollers (17) of the control cranks (16) of the tool-carrier arms (11) during tedding comprises a vertical offset (38) in order to reduce the rotation speed of the extremities of the working tools (12) when these are situated in the working zone Y-Z.

8. A machine according to claim 3, characterised in that the diameter (C) of the rollers (17) of the control cranks (16) of the tool-carrier arms (11) is equal to or greater than the sum of the height (H) of the vertical offset (24) of the guide track (20) intended to guide the said rollers (17) during windrowing and the diameter (D) of the tool-carrier arms (11).

9. A machine according to claim 1, characterised in that the rollers (17) of the control cranks (16) of the tool-carrier arms (11) of one and the same rake wheel are transposed from the guide track (20) intended to guide the said rollers (17) during windrowing to the guide track (19) intended to guide the said rollers (17) during tedding by outward pivoting of the tool-carrier arms (11) and their support bearings (13) about their pivot pins (15) to the drive hub (14) under the action of centrifugal force when the said rake wheel is driven in rotation and the said tool-carrier arms (11) and their support bearings (13) are unlocked from the windrowing position.

10. A machine according to claim 9, characterised in that the transposition of the rollers (17) of the control cranks (16) of the tool-carrier arms (11) from the guide track (20) intended for their guidance during windrowing to the guide track (19) intended for their guidance during tedding, causes an increase of diameter of the trajectory (T) described by the working tools (12) during tedding.

11. A machine according to claim 1, characterised in that the rollers (17) of the control cranks (16) of the tool-carrier arms (11) of one and the same rake wheel (1 or 2) are transposed from the guide track (19) intended for their guidance during tedding to the guide track (20) intended for their guidance during windrowing by inward pivoting of the tool-carrier arms (11) and their bearings (13) about their pivot pins (15) to the drive hub (14) especially under the action of the inherent weight of the said tool-carrier arms (11), the support bearings (13) and the working tools (12) when the said rake wheel is substantially stationary and the said tool-carrier arms (11) and their support bearings (13) are unlocked from the tedding position.

12. A machine according to claim 1, characterised in that the rollers (17) of the control cranks (16) of the tool-carrier arms (11) can be held on the guide track (19) intended for their guidance during tedding or on the guide track (20) intended for their guidance during windrowing by means of a positioning member (25) mounted freely in rotation on the support shaft (26) of the corresponding rake wheel, which by means of rods (27) immobilises all the tool-carrier arms (11) and their support bearings (13) of the said rake wheel (1 or 2) in two different positions, one close to the said support shaft (26) of the rake wheel in which the said rollers (17) are situated on the guide track (20) intended for their guidance during windrowing, and the other more remote from the said support shaft (26), in which the said rollers (17) are situated on the guide track (19) intended for their guidance during tedding.

13. A machine according to claim 12, characterised in that the positioning member (25) can be locked in rotation in order to maintain the rollers (17) of the control cranks (16) on the guide track (19) intended for their guidance during tedding or on the guide track (20) intended for their guidance during windrowing, by means of a spring bolt (28) disposed on a protector (29) fast with the drive hub (14), the said bolt (28) being capable of engaging in lodgements of a positioning plate (33) fast with the positioning member (25).

14. A machine according to claim 12, characterised in that the positioning member (25) can be locked in rotation in order to maintain the rollers (17) of the control cranks (16) on the guide track (19) intended for their guidance during tedding or on the guide track (20) intended for their guidance during windrowing by means of a bolt (39) articulated to the drive hub (14) and cooperating with two bosses (41 and 42) fast with the positioning member (25), for the purpose of locking the latter.

15. A machine according to claim 14, characterised in that the extremities (44 and 45) of a flat spring (46) bear against the bosses (41 and 42) of the positioning member (25) and prevent the fork (40) of the bolt (39) from returning immediately into the locking position when it has been operated for the purpose of a change of working position.

16. A machine according to claim 15, characterised in that the extremities (44 and 45) of the flat spring (46) extend beyond the bosses (41 and 42) of the positioning member (25).

17. A machine according to claim 14, characterised in that the interval between the two bosses (41 and 42) is less than the total width of the fork (40) of the bolt (39).

* * * * *